R. W. BURNETT.
CAR TRUCK.
APPLICATION FILED JAN. 2, 1912.
1,201,689.
Patented Oct. 17, 1916.
2 SHEETS—SHEET 1.
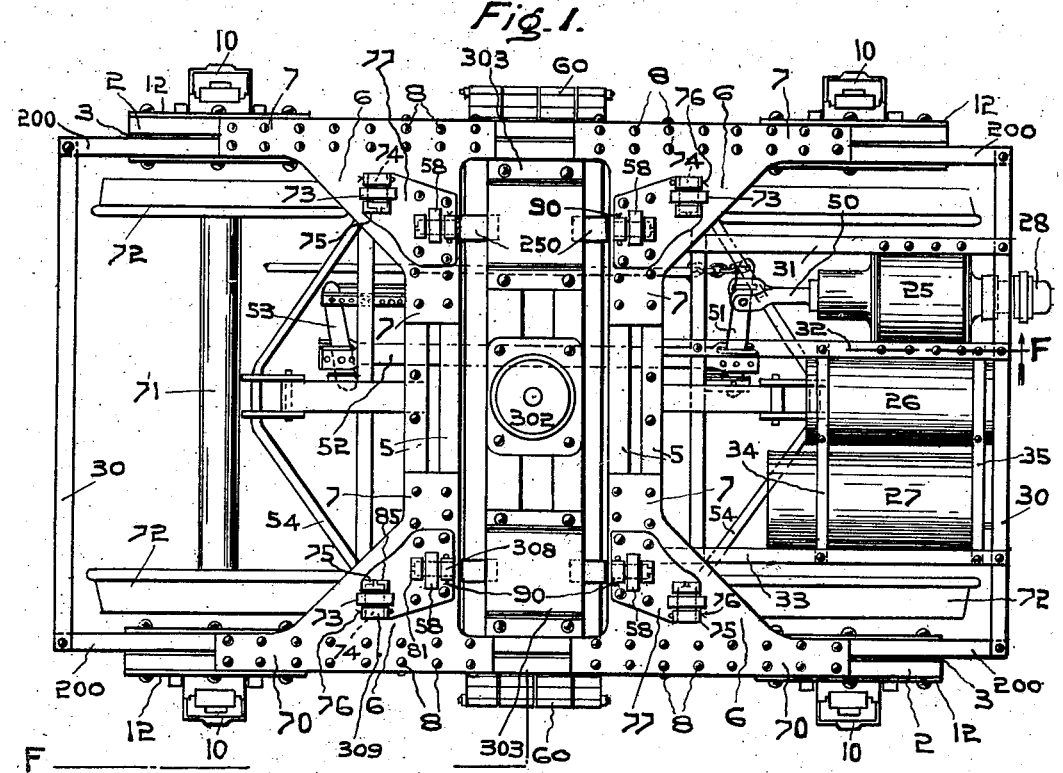
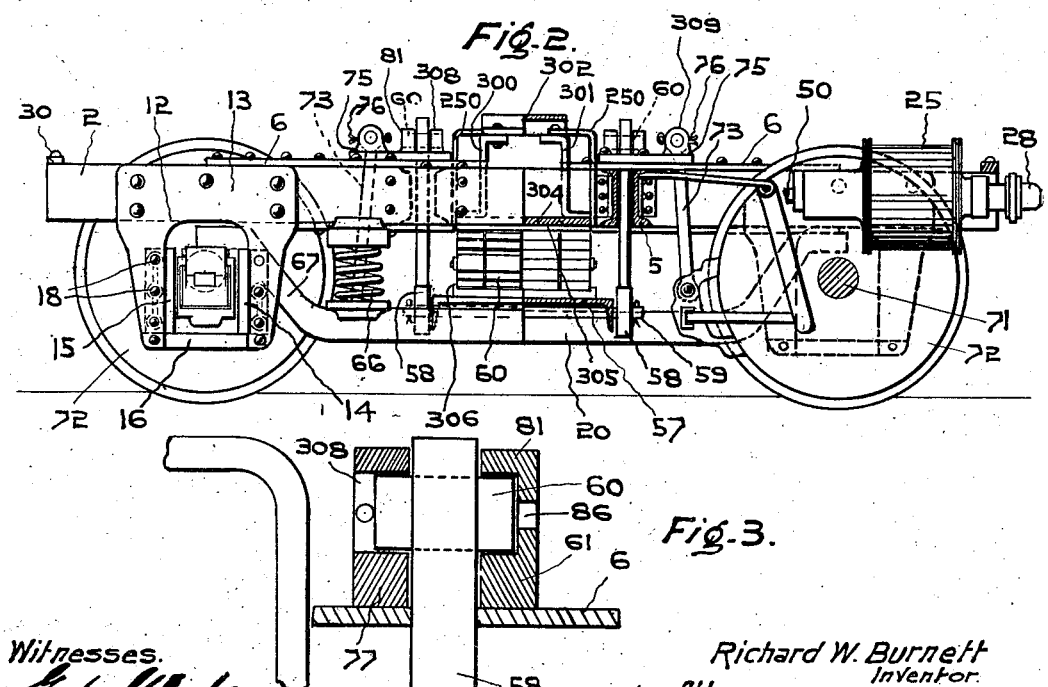
Witnesses.
Richard W. Burnett
Inventor.
per Attorney.

R. W. BURNETT.
CAR TRUCK.
APPLICATION FILED JAN. 2, 1912.
1,201,689.
Patented Oct. 17, 1916.
2 SHEETS—SHEET 2.
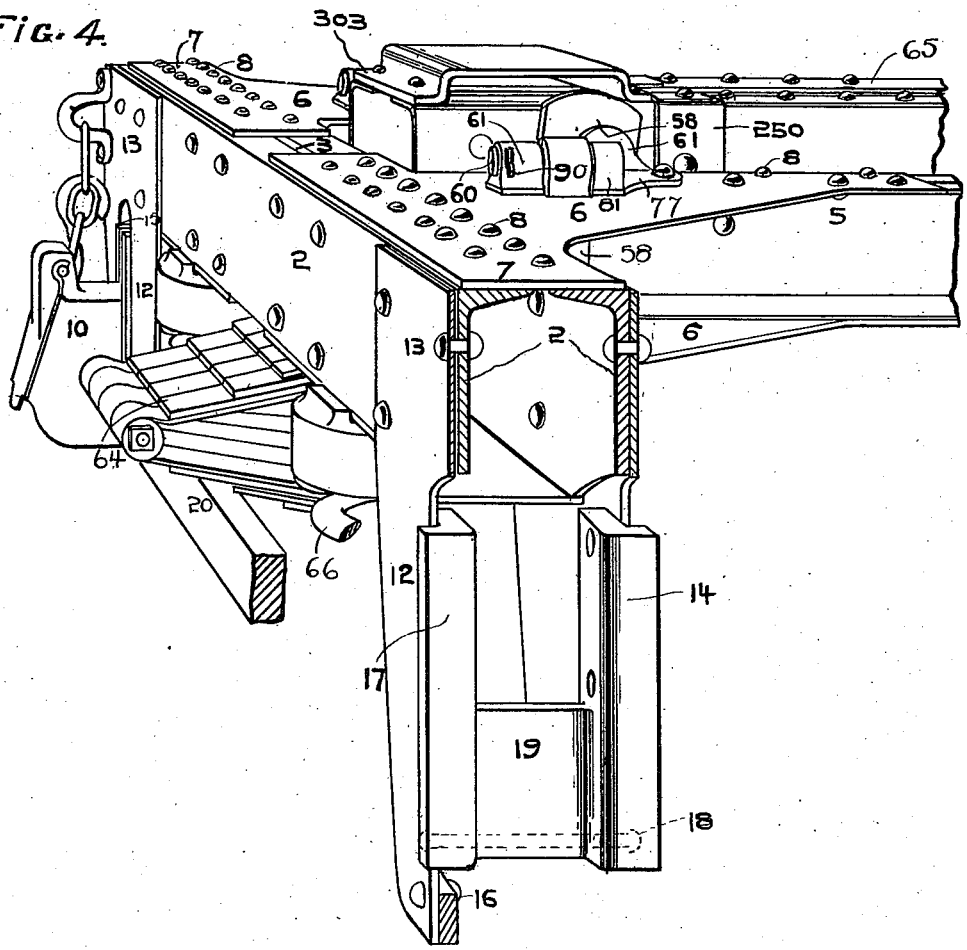
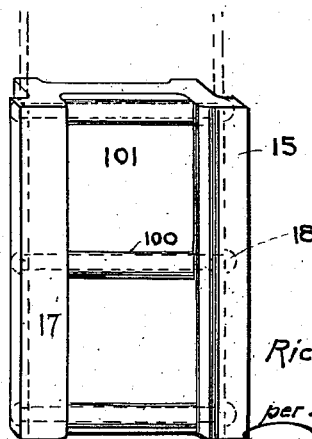
Witnesses.
Richard W. Burnett
Inventor
per Attorney

UNITED STATES PATENT OFFICE.

RICHARD WEBB BURNETT, OF MONTREAL, QUEBEC, CANADA.

CAR-TRUCK.

1,201,689. Specification of Letters Patent. Patented Oct. 17, 1916.

Application filed January 2, 1912. Serial No. 669,019.

*To all whom it may concern:*

Be it known that I, RICHARD WEBB BURNETT, residing at the city of Montreal, Province of Quebec, Dominion of Canada, have invented certain new and useful Improvements in Car-Trucks; and I do hereby declare that the following is a full, clear, and exact description thereof.

My improved truck is designed to take the place of wooden trucks wherein the side sills twist under what are considered normal side thrusts of the car. In these wooden trucks it has been necessary to use sufficient metal to reinforce the wood and form the conventional composite wood and metal truck. This composite truck is exceedingly heavy and bulky and of necessity composed of members which could not be held permanently together but would after very little use become loose.

This invention provides an all metal truck utilizing in its composition less metal than used in the composite truck and, at the same time, dispensing with all the wood, the joints between the various parts being made by rivets, and, consequently, being proof against loosening and at the same time affording the required resistance to the twisting of the side sills.

As heretofore constructed the brake mechanism is partly in the car body and partly on the truck, the force being exerted on the car-body and transmitted to the mechanism on the truck with the following disadvantages: To apply the brakes the power was transmitted from the cylinder on the car-body through a multiplicity of levers and rods to the brake lever on the truck, this truck lever being in turn operatively connected to the brake beams, the power being utilized first in taking up the slack or lost motion in the different connections of the levers and rods on the car body and then the lost motion between the car-body and truck and furthermore, the invention practically eliminates the well-known variation in air brake piston travel between the parts thereof when the car is standing and when in motion and causing all the individual brake mechanisms at the different parts of wheels to be uniform. Furthermore, when the brakes were applied with the trucks rounding a curve the braking strain would be different from the braking strain when the trucks were traveling in a straight line, and the piston travel would also vary. These disadvantages are overcome by my invention and the truck has imparted thereto maximum flexibility for the irregular relative vertical movement of the axle boxes or pedestals while affording the maximum resistance to all horizontal movements.

The invention consists of the combination with a pair of side-sills each consisting of a pair of spaced channels with their flanges in apposition, and a pair of spaced transoms, means uniting the transoms to the side-sills and comprising angle brackets secured to the same throughout the height thereof and gusset plates each extending over and acting as a cover-plate for both the transom members and both side-sill members and riveted to the flanges of the transoms and side sills and intersecting the vertical planes of the pedestals, pedestal-plates riveted to the opposite sides of the side-sills in juxtaposition with the journals and combined liners and spacers secured between the pedestal-plates. The coaction of this combination of elements, owing to their mutual supporting and bracing qualities, constitutes a truck capable of sustaining all normal strains with minimum material and consequently weight.

For full comprehension, however, of my invention reference must be had to the accompanying drawings forming a part of this specification in which similar reference characters indicate the same parts, and wherein:

Figure 1 is a plan view of my improved truck partly in horizontal sectional view; Fig. 2 is a longitudinal sectional view taken on line F F Fig. 1; Fig. 3 is a transverse vertical sectional view taken on lines B B and D D Fig. 2; and Fig. 4 is a sectional perspective view of one corner of the truck; and Fig. 5 is a detail perspective view of one of the liner-spacers.

The side-sills as before mentioned consist of channels 2 2 spaced as at 3 and rigidly united to a pair of spaced channels 5 set back to back. These members are united throughout their height by angle-brackets 4 and at the top and bottom by plate metal plate gussets 6 extending over slightly less than one half of the length of the transoms and over the side-sills from a point at the junction of the transom and at each side thereof to a point in vertical line with the axis of the journals for which purpose the plates have extensions 7 and 70 along the side-sills toward the ends of the truck, thus serving the double purpose of cover plates for the transom and side-sills. The connection between the brackets and plates and side-sills and transoms being effected entirely through the flanges of the channels by rivets 8; the structure thus formed has maximum strength of connection between the transoms and side sills owing to the box cross-section.

Wide surfaced guides for the journal boxes 10 and efficient light-weight pedestals are formed by inverted U-plates 12 with widened tops 13, and cast-metal combined spacers and wearing members 14 and 15. A pair of the plates are riveted at the opposite sides of each end of the side-sills and each has a cross-brace 16 riveted to and connecting the lower ends of its legs, and the spacer-wearing-members are disposed transversely to the sills and connected by long rivets 18 to the legs of the pedestal-plates. The members consist of side bars 17 extending practically the full height of the space within the pedestals and connected together in an integral member by webs, which, in the case of the members at the ends of the truck, extend throughout their height as at 101 with transverse thickened portions 100 cored or drilled for the long rivets; while the webs 19 of the other members are slightly less than half the height of their side bars to afford necessary space above them to accommodate the ends of the equalizer bars 20. This latter construction enables either the equalizer bar to be removed without dismembering the balance of the truck otherwise than by the displacement of one of the members 14.

The truck frame is constructed as above to afford the greatest carrying capacity with the least material and weight, and, in addition, to carry the air-brake mechanism. The latter comprises brake-cylinder 25, auxiliary reservoir 26, supplementary reservoir 27, and triple valve 28, to support which a carrier frame is mounted on the truck consisting of an angle-iron cross bar 30 resting upon and riveted to the inner channels of the side-sills which are extended as at 200 for this purpose and a series of preferably three longitudinal angle-iron bars 31, 32 and 33 supported at their opposite ends upon and riveted to the cross-bar 30 and the adjacent transom and intermediate angle-iron cross bars 34 and 35 supported by and riveted to the frame bars 32 and 33. This frame carries the cylinder and reservoirs which are suitably braced, the triple valve being carried on the outer end of the brake-cylinder.

The piston rod 50 is connected to lever 51 and through brake-rod 52 to lever 53, such levers being connected to the brake-beam 54.

Below the transom is the spring plank 57 swung by four spring hangers, 58, connected at their lower ends to the spring-hanger axles 59 and at their upper ends to pins 60 in bearings 61 on the upper surface of the gussets 6. The leaf springs 64 are supported on the spring plank and in turn support the bolster to be presently described. The equalizing springs are indicated at 66. The goose-necks, 67, of the equalizing bars rest on the boxes, 10, contained in the pedestals.

71 are the axles and 72 the wheels of the truck.

The brake hangers are shown at 73 and they are hung from headless hanger pins 74 of uniform diameter located in bearings 75 exceeding them in length and in which they are retained by cotter pin 76.

The bearings 61 and 75 are cast in one piece with an attachment plate 77 riveted to the gussets. The bearings consist of a sleeve 61 and a sleeve 75, each blocked at one end by a portion of the bearing forming a partial closure of that end which has a small hole 86; the hanger pins 60 and 74 being slipped through the sleeves and upper ends of the hangers 58 and 73 into the cups, and held in place by cotter pins 90 passed through protruding ends of the sleeves and across the front of the hanger pins without entering the latter. In order to receive the upper ends of the hangers the sleeves are divided into separate parts 61 and 81 and 75 and 85 all cast upon the same carrier plate as just mentioned. These bearings are located at right angles to the bolster with their open ends in close proximity thereto, and chafing plates 250 are riveted to the bolster and extend downwardly between the latter and the truck frame in position to be borne upon by the hanger pins if the cotters are not in place, thus preventing accidental displacement of the hanger pins and, possibly, derailment of the truck by the hanger falling across one of the rails. To remove the hangers the cotters are first removed the chafing plates unfastened and the pins knocked out by a punch or drift inserted through the holes 86.

An advantage of casting the bearings in one piece with the plates 77 and attaching the latter to the gussets is that the latter, and consequently the entire truck, is stiffened.

The function of the gussets 6 is to form the side sills into box sections, and at the same time owing to their connection with the transoms act as braces against diagonal movement of the truck, and also act as an additional support augmenting the angles 4 in their attachment of the transoms to the side sills. Another function of these gussets is the supporting of the castings 77 to which the brake hanger 73 and spring hanger 58 are connected.

The advantage of my particular construction of pedestal is that as the parts thereof become defective they may be renewed without sacrificing any of the other parts.

The bolster consists of a pair of Z-bars 300 and 301 arranged with their upper flanges in apposition and braced and tied together by a center plate 302 and side bearings of inverted U-form in cross-section with flanges 303 extending transversely to the bolster; the bottom flanges being united by a center tie-plate 304 and combination tie-plates and spring-seats 305. The springs are supported upon spring-seats 306 resting upon the spring-plank. All the parts of this bolster are riveted together.

What I claim is as follows:—

1. In a truck the combination with a spring plank and a spring supported thereon, of side-sills each comprising a pair of channels, spaced transoms each comprising a pair of spaced channels, truck hangers connected at their lower ends to the spring plank and projecting upwardly between the channels of the respective transoms, flat combination cover and gusset plates riveted to the transoms and to the sills and extending completely across the sills and along the same to points intersecting the vertical planes of the pedestals, such plates having means supporting the upper ends of the hangers.

2. In a truck the combination with a spring plank and a spring supported thereon, of side-sills each comprising a pair of channels, spaced transoms each comprising a pair of spaced channels, truck hangers connected at their lower ends to the spring plank and projecting upwardly between the channels of the respective transoms, a pair of spaced flat combination cover and gusset plates located at the respective sides of the truck frame and riveted to the transoms and to the sills and extending completely across the sills and along the same to points intersecting the vertical planes of the pedestals, such plates having means supporting the upper ends of the hangers.

3. In a truck the combination with a member movable within restricted limits, of side sills each comprising a pair of channels, spaced transoms, hangers connected at their lower ends to the said member and projecting upwardly, flat combination cover and gusset plates riveted to the transoms and to the sills and extending completely across the sills and along the same to points intersecting the vertical planes of the pedestals, such plates having openings through which the upper ends of the hangers project, and means upon the plates and supporting the said upper end of the hangers.

4. In a truck the combination with a spring plank and a spring supported thereon, of side-sills each comprising a pair of channels, spaced transoms each comprising a pair of spaced channels, truck hangers connected at their lower ends to the spring plank and projecting upwardly between the channels of the respective transoms, flat combination cover and gusset plates riveted to the transoms and to the sills and extending completely across the sills and along the same to points intersecting the vertical planes of the pedestals, such plates having openings through which the upper ends of the hangers project, and means upon the plates and supporting the said upper ends of the hangers.

5. In a truck the combination with side-sills each comprising a pair of channels and spaced transoms, or flat combination cover and gusset plates riveted to the transoms and to the sills and extending completely across the sills and along the same to points intersecting the vertical plane of the pedestal journals and stiffening devices for the gussets consisting of plates cast with bearings thereon for the brake and truck hangers.

6. In a truck the combination with side-sills and spaced transoms, of flat combination cover and gusset plates riveted to the transoms and to the sills and extending completely across the sills and along the same to points intersecting the vertical plane of the pedestal journals and devices mounted upon the gussets consisting of plates cast with bearings thereon for the brake and truck hangers.

7. In a truck the combination with side-sills, of a series of pedestals each consisting of a pair of inverted U-plates riveted to opposite sides of a sill, and wearing members uniting the legs of one U-plate to the legs of the other, one of the said wearing members consisting of vertical side-bars and a vertical web having transverse cored or drilled enlargements for the rivets, such enlargements extending the full width of the vertical web and the other members consisting of vertical side-bars and a vertical web located at the lower ends of the side-bars.

8. In a truck the combination with side-sills, of a series of pedestals each consisting of a pair of inverted U-plates riveted to opposite sides of a sill, and wearing members uniting the legs of one U-plate to the legs of the other, one of the said wearing members consisting of vertical side-bars and a vertical web equal in height to the bars and having transverse cored or drilled enlargements for the rivets and other members consisting of vertical side-bars and a vertical web of relatively reduced height and located at the lower ends of the side-bars.

9. In a truck the combination with side-sills each comprising a pair of channels, and spaced transoms, of flat combination cover and gusset plates riveted to the transoms and to the sills and extending completely across the sills and along the same to points intersecting the vertical planes of the pedestals, a series of pedestals each consisting of a pair of inverted U-plates riveted to opposite sides of a sill, and spacer members uniting the legs of one U-plate to the legs of the other, one of the said spacer-wearing members consisting of vertical side-bars and a vertical web equal in height to the bars and having transverse cored or drilled enlargements for the rivets and the other spacer-liner consisting of vertical side-bars and a vertical web of relatively reduced height and located at the lower ends of the side-bars.

10. In a truck the combination with side-sills each comprising a pair of spaced channels with their flanges in apposition, pedestals, each consisting of a pair of inverted U-plates riveted to opposite sides of a sill, and wearing members uniting the legs of one U-plate to the legs of the other, one of the said members consisting of vertical side-bars and a vertical web equal in height to the bars and having transverse cored or drilled enlargements for the rivets and the other member consisting of vertical side-bars and a vertical web of relatively reduced height and located at the lower ends of the side-bars, spaced transoms and flat combination cover and gusset plates riveted to the transoms and to the sills and extending completely across the sill and along the same to points intersecting the vertical planes of the pedestals.

11. In a passenger car truck the combination with the truck frame, truck hangers and brake hangers, of a hanger-bracket consisting of a casting embodying as component integral members an attachment plate and a pair of bearings for brake hanger and truck hanger respectively, such casting being constructed and arranged for attachment to or separation from the truck frame.

12. In a passenger car truck a pivotal connection for a hanger comprising a bearing consisting of a horizontal sleeve blocked at one end by a portion of the bearing and full open at its opposite end, a straight hanger-pin of uniform diameter throughout its length and carried within the bearing, such blocked end having an opening for the insertion of a device for displacing the hanger pin and a cotter pin passing through the bearing for the purpose of retaining the hanger-pin.

13. In a truck the combination with a spring plank and a spring supported thereon, of side-sills each comprising a pair of channels, spaced transoms each comprising a pair of spaced channels, truck hangers connected at their lower ends to the spring plank and projecting upwardly between the channels of the respective transoms, flat combination cover and gusset plates riveted to the transoms and to the sills and extending completely across the sills and along the same to points intersecting the vertical planes of the pedestals.

14. In a truck the combination with a member movable within restricted limits, of side-sills each comprising a pair of channels, spaced transoms, hangers connected at their lower ends to the said member and projecting upwardly; flat combination cover and gusset-plates riveted to the transoms and to the sills and extending completely across the sills and along the same to points intersecting the vertical planes of the pedestals, such plates having openings through which the upper ends of the hangers project.

15. In a truck the combination with a spring plank and a spring supported thereon, of side-sills each comprising a pair of channels, spaced transoms each comprising a pair of spaced channels, truck hangers connected at their lower ends to the spring plank and projecting upwardly between the channels of the respective transoms, flat combination cover and gusset-plates riveted to the transoms, and to the sills and extending completely across the sills and along the same to points intersecting the vertical planes of the pedestals, such plates having openings through which the upper ends of the hangers project.

16. In a truck the combination with side-sills of a series of pedestals each consisting of a pair of inverted U-plates riveted to opposite sides of a sill, and wearing members uniting the legs of one U-plate to the legs of the other, each of said wearing members consisting of vertical side-bars and a vertical web uniting the same and having transversed cored or drilled enlargements for the rivets.

In testimony whereof I have signed my name to this specification in the presence of two witnesses.

Montreal, November 25th, 1911.

RICHARD WEBB BURNETT.

Witnesses:
  LEWIS C. ORD,
  GORDON G. COOKE.

Correction in Letters Patent No. 1,201,689.

It is hereby certified that in Letters Patent No. 1,201,689, granted October 17, 1916, upon the application of Richard Webb Burnett, of Montreal, Quebec, Canada, for an improvement in "Car-Trucks," an error appears in the printed specification requiring correction as follows: Page 3, line 80, claim 5, for the word "or" read *of;* and that the said Letters Patent should be read with this correction therein that the same may conform to the record of the case in the Patent Office.

Signed and sealed this 19th day of December, A. D., 1916.

[SEAL.]                                  R. F. WHITEHEAD,
*Acting Commissioner of Patents.*